US 12,325,166 B2

(12) United States Patent
Moore et al.

(10) Patent No.: US 12,325,166 B2
(45) Date of Patent: *Jun. 10, 2025

(54) MOLD PLATE COOLING ARRANGEMENT

(71) Applicant: DME COMPANY LLC, Madison Heights, MI (US)

(72) Inventors: David James Moore, Westland, MI (US); Peter Richard Smith, Shelby Township, MI (US)

(73) Assignee: DME Company LLC, Madison Heights, MI (US)

( * ) Notice: Subject to any disclaimer, the term of this patent is extended or adjusted under 35 U.S.C. 154(b) by 27 days.

This patent is subject to a terminal disclaimer.

(21) Appl. No.: 18/403,816

(22) Filed: Jan. 4, 2024

(65) Prior Publication Data

US 2024/0131764 A1     Apr. 25, 2024

Related U.S. Application Data

(63) Continuation of application No. 17/767,770, filed as application No. PCT/US2020/055722 on Oct. 15, 2020.

(60) Provisional application No. 62/915,240, filed on Oct. 15, 2019.

(51) Int. Cl.
  *B29C 45/73*    (2006.01)
(52) U.S. Cl.
  CPC ................. *B29C 45/7312* (2013.01)
(58) Field of Classification Search
  CPC .................................................. B29C 45/2673
  See application file for complete search history.

(56) References Cited

U.S. PATENT DOCUMENTS

| 4,804,128 | A | | 2/1989 | Brittin |
| 4,872,827 | A | * | 10/1989 | Noda ................. B29C 33/56 |
| | | | | 249/141 |
| 11,897,175 | B2 | * | 2/2024 | Moore ............... B29C 45/2737 |
| 2004/0126456 | A1 | | 7/2004 | Nishioka et al. |
| 2007/0108668 | A1 | | 5/2007 | Hutchinson et al. |
| 2013/0295220 | A1 | | 11/2013 | Neufarth et al. |
| 2020/0316835 | A1 | | 10/2020 | Ellis et al. |
| 2022/0088838 | A1 | | 3/2022 | Feigenblum |

OTHER PUBLICATIONS

International Search Report issued Jan. 21, 2021 in Intl. Appl. No. PCT/US2020/055722.
U.S. Appl. No. 17/767,770, filed Apr. 8, 2022, David James Moore.

* cited by examiner

*Primary Examiner* — Virak Nguon
(74) *Attorney, Agent, or Firm* — Dinsmore & Shohl LLP

(57) ABSTRACT

A fluid cooled mold plate is disclosed. The fluid cooled mold plate has a front side, a rear side, and a perimeter that extends between its front and rear sides. A cooling chamber is formed within the mold plate. The cooling chamber has a front wall, a rear wall, and a perimeter wall that extends between the front and rear walls. An inlet fluid duct extends from a first side of the mold plate perimeter to a first end of the cooling chamber and an outlet fluid duct extends from a second side of the mold plate perimeter to a second end of the cooling chamber. The cooling chamber is occupied by a turbulence generating dispersion mesh that is secured between the front and rear walls the cooling chamber.

20 Claims, 12 Drawing Sheets

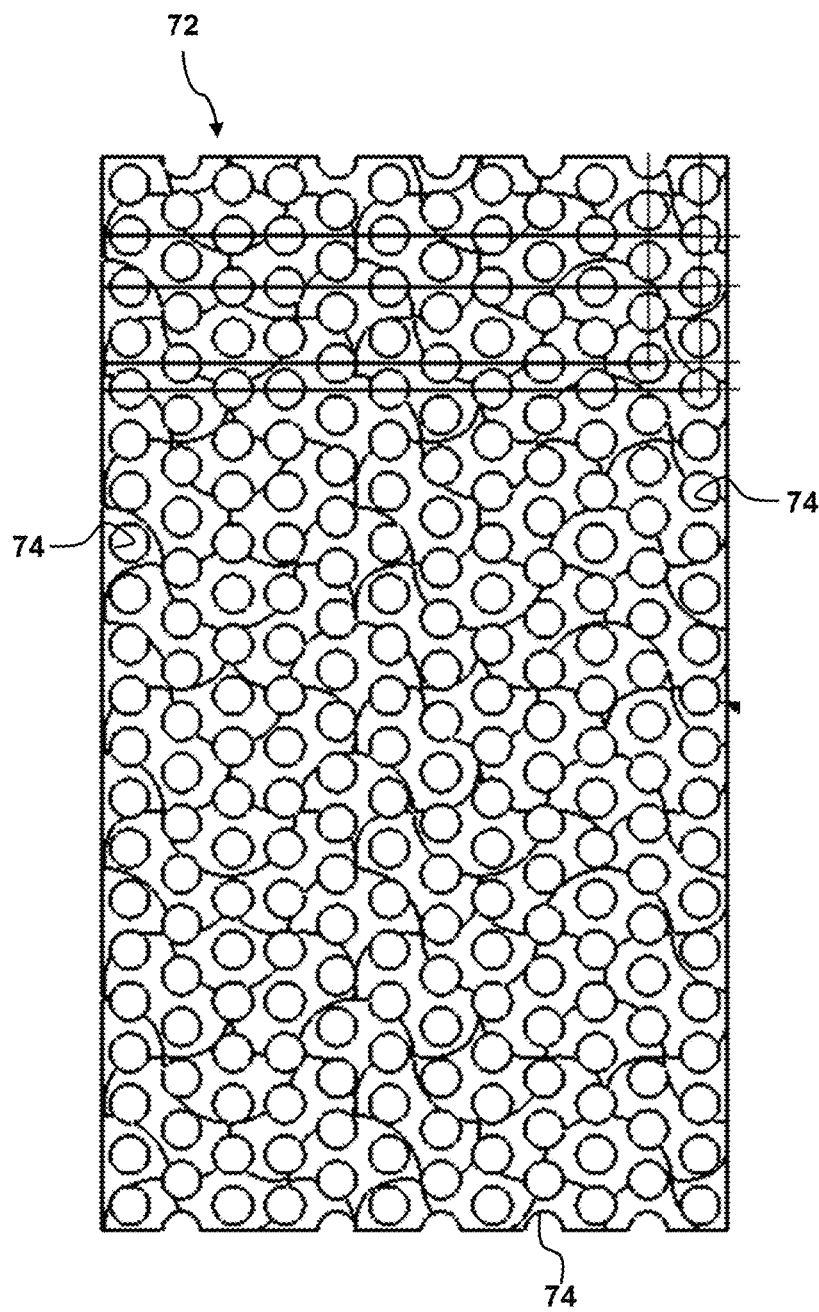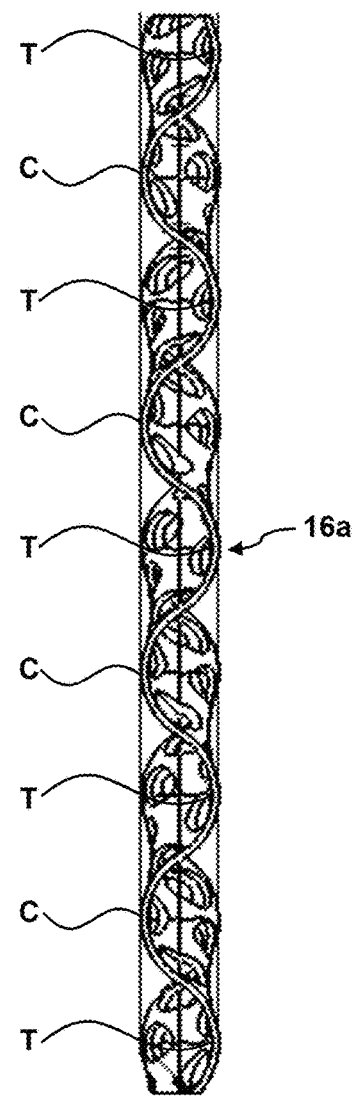
FIG. 5
FIG. 6

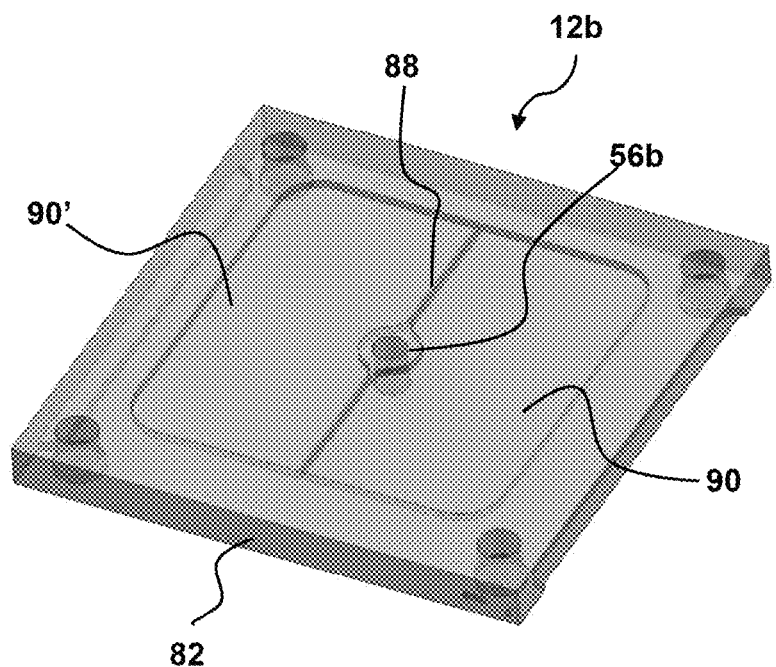
FIG. 10
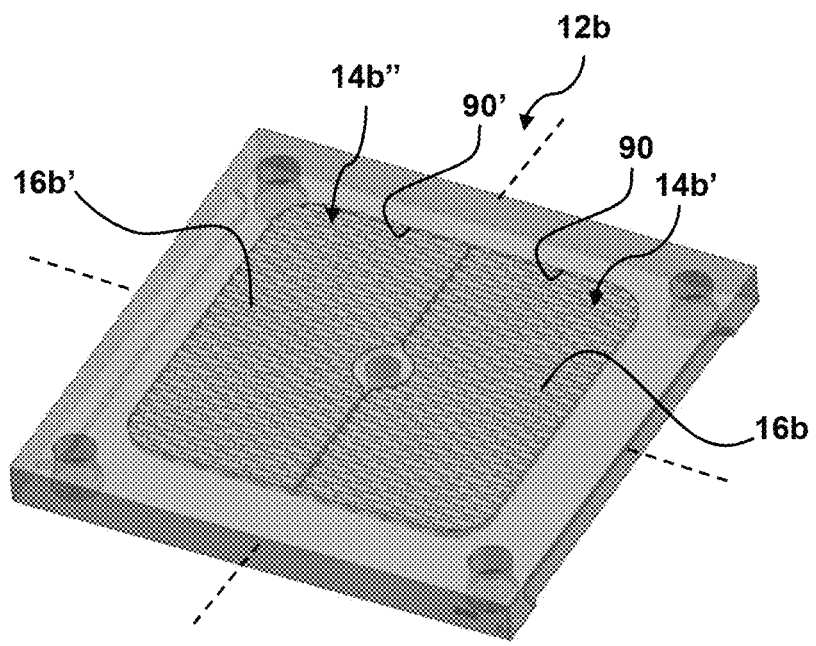
FIG. [11]

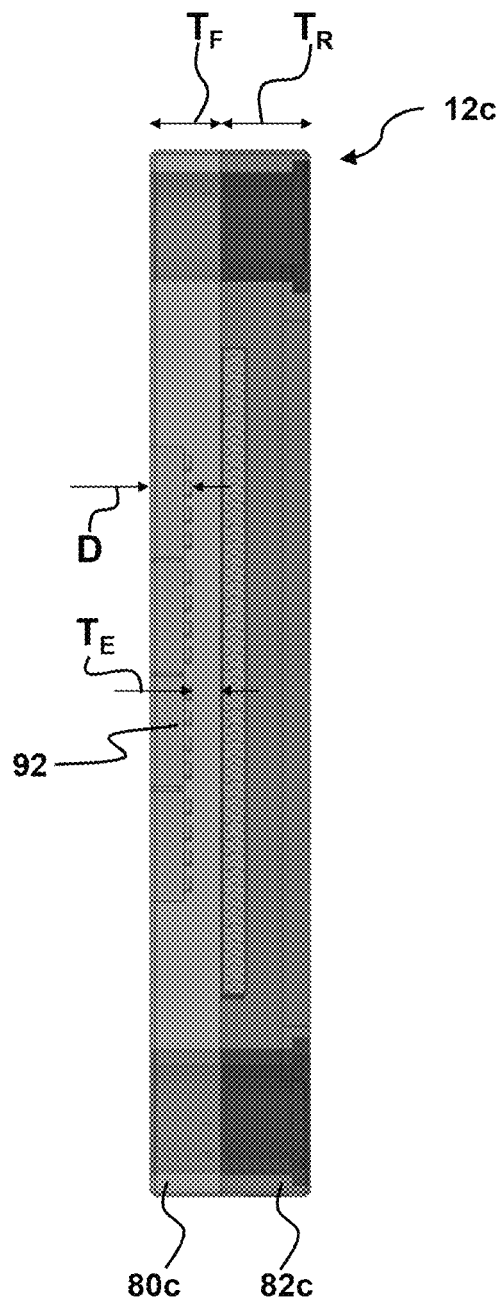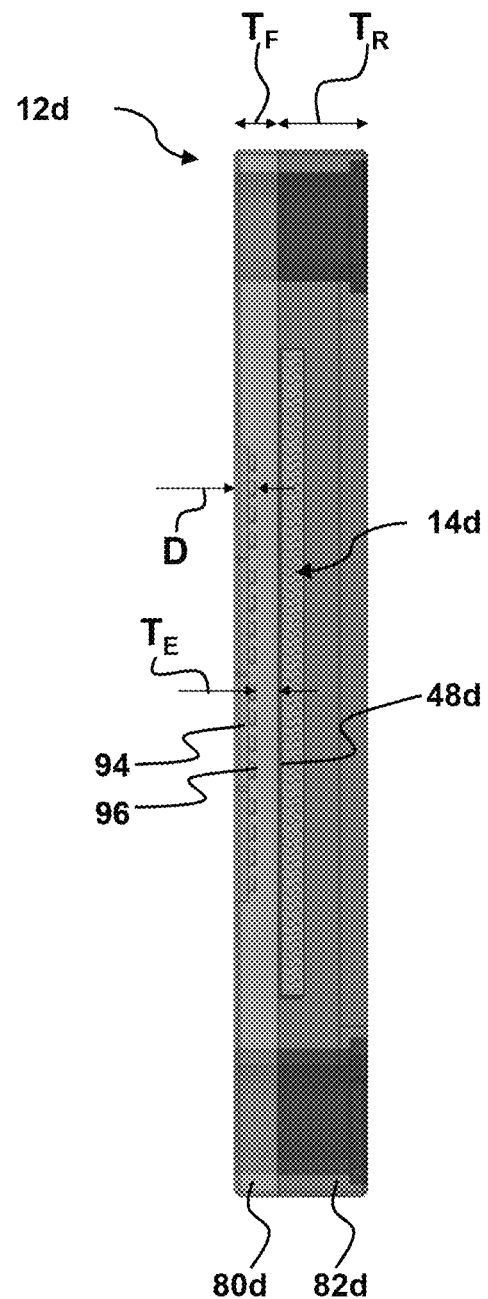
FIG. 13
FIG. 14

MOLD PLATE COOLING ARRANGEMENT

CROSS-REFERENCE TO RELATED APPLICATIONS

This application is a continuation application of co-pending U.S. patent application Ser. No. 17/767,770, filed Apr. 8, 2022, which is the national stage entry of International Patent Application No. PCT/US2020/055722, filed Oct. 15, 2020, which claims the benefit of U.S. Provisional Patent Application Ser. No. 62/915,240, filed Oct. 15, 2019, which are hereby incorporated by reference in their entirety including the drawings.

TECHNICAL FIELD

The present invention relates to injection molding, and more particularly to a cooling arrangement for a mold plate of an injection mold.

BACKGROUND

Mold plates are typically cooled by a plurality of connected drilled passages that form a cooling circuit within the mold plate. When cooling fluid is circulated through the cooling circuit, a temperature profile of the mold plate is uneven, and generally conforms to the shape of the cooling circuit. That is, the temperature of the mold plate is generally colder along the pathway of the cooling circuit and is generally warmer in areas spaced away from the cooling circuit. When connected drilled passages are used to form a cooling circuit within a mold plate for molding thin, flat articles, the uneven temperature profile of the molding surface which defines the shape of the flat article can result in defective molded articles exhibiting negative attributes such as warping and uneven shrinkage.

SUMMARY

Embodiments hereof are directed to a fluid cooled mold plate having a front side, a rear side, and a perimeter that extends between the front side and the rear side. A cooling chamber is formed within the mold plate. The cooling chamber has a front wall, a rear wall, and a perimeter wall that extends between the front wall and the rear wall. An inlet fluid duct extends from a first side of the perimeter of the mold plate to a first end of the cooling chamber and an outlet fluid duct that extends from a second side of the perimeter of the mold plate to a second end of the cooling chamber that is opposite to the first end of the cooling chamber, and the cooling chamber occupied by a dispersion mesh that is secured between the front wall and the rear wall of the cooling chamber.

BRIEF DESCRIPTION OF DRAWINGS

FIG. 5 is a top view of a sheet of material from which a dispersion mesh of the dispersion cooling mold plate of FIG. 2 is formed.

FIG. 6 is a side view of the dispersion mesh of the dispersion cooling mold plate of FIG. 2.

FIGS. 10, 11, and 12 are perspective views of a manufacturing sequence of the dispersion cooling mold plate of FIGS. 8 and 9.

FIG. 13 is a top transparent view of a dispersion cooling plate, in accordance with yet another embodiment of the present disclosure.

FIG. 14 is a top transparent view of a dispersion cooling plate, in accordance with yet another embodiment of the present disclosure.

DETAILED DESCRIPTION

In the following description there is no intention to be bound by any expressed or implied theory presented in the preceding technical field, background, summary, or the following detailed description.

Figure 1:
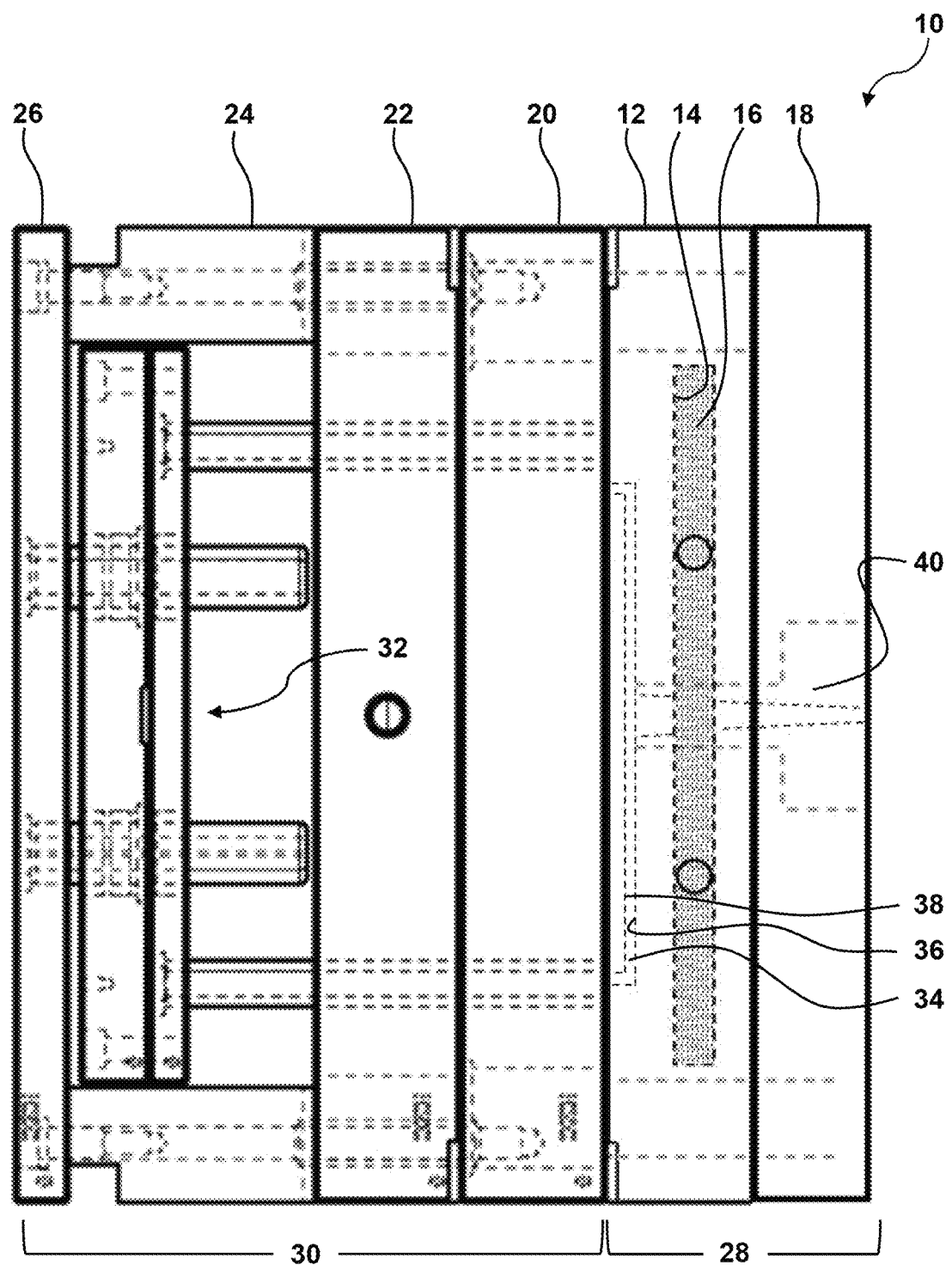
FIG. 1 is a top view of an injection mold having a dispersion cooling mold plate in accordance with an embodiment of the present disclosure.

FIG. 1 is a top view of an injection mold 10, also referred to as mold 10, having a dispersion cooling mold plate 12 in accordance with an embodiment of the present disclosure. Dispersion cooling mold plate 12, also referred to as cooling plate 12, includes a cooling chamber 14 formed therein. Cooling chamber 14 is occupied by a dispersion mesh 16, which evenly distributes a flow of cooling fluid within cooling chamber 14. Cooling plate 12, is suitable for use in a variety of injection molding applications including injection molding of shallow draw parts such as roof tiles, lids for reusable food containers, wall plates for electrical outlets, and smart phone cases.

Mold 10 includes a plurality of mold plates such as a top clamp plate 18, cooling plate 12, a core plate 20, a support plate 22, a set of parallels 24, and a bottom clamp plate 26. Top clamp plate 18 and cooling plate 12 are fastened together and are part of a stationary side 28 of mold 10 which, in operation, is typically mounted to the stationary platen of an injection molding machine (not shown). Core plate 20, support plate 22, parallels 24, and bottom clamp plate 26 are fastened together and are part of a moving side 30 of mold 10 which, in operation is typically mounted to a moving platen of the injection molding machine. Bottom clamp plate 26 and core plate 20 are separated by support plate 22 and parallels 24 which, together with bottom clamp plate 26, house an ejector assembly 32 which removes a newly molded article (not shown) from a mold cavity 34 (shown in phantom) that is defined between stationary side 28 and moving side 30. Mold cavity 34 is defined by a cavity portion 36 that formed in cooling plate 12 and a core portion 38 that projects from core plate 20 into cavity portion 36. Stationary side 28 further includes a melt delivery component, such as a sprue bushing 40 (shown in phantom), which delivers molten molding material, injected by the injection molding machine, to mold cavity 34.

Mold 10 further includes fastening and aligning components, such as fasteners, dowels, guide pins and bushings etc. (shown in phantom), by which mold plates 18, 20, 22, 24, 26 are held together and are located relative to each other. Mold 10 may also include more or fewer mold plates than are shown in FIG. 1.

Injection molds, such as mold 10, are often manufactured from standardized mold plates and/or standardized mold bases which are at least partially finished by a mold plate/base supplier and are completed by a mold maker according to a specific molding application. Standardized mold plates and mold bases are well known in the art of injection molding. Non-limiting examples of a standardized mold base include XPRESS™ A-Series Mold Base available from D M E Co of Madison Heights Michigan, U.S.A.

Figure 2:
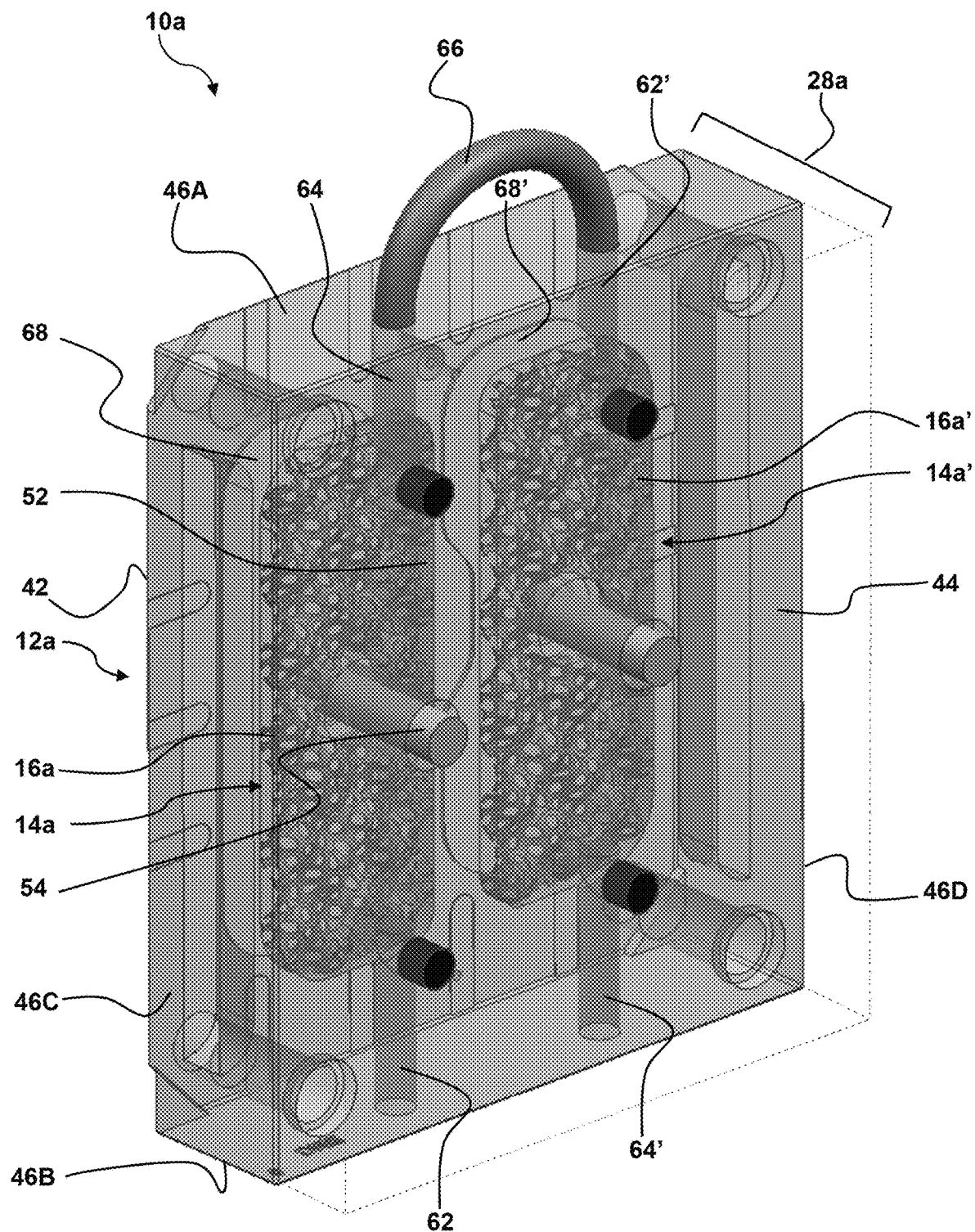
FIG. 2 is a rear perspective view of a stationary side of a mold having a dispersion cooling mold plate in accordance with another embodiment of the present disclosure.
Figure 3:
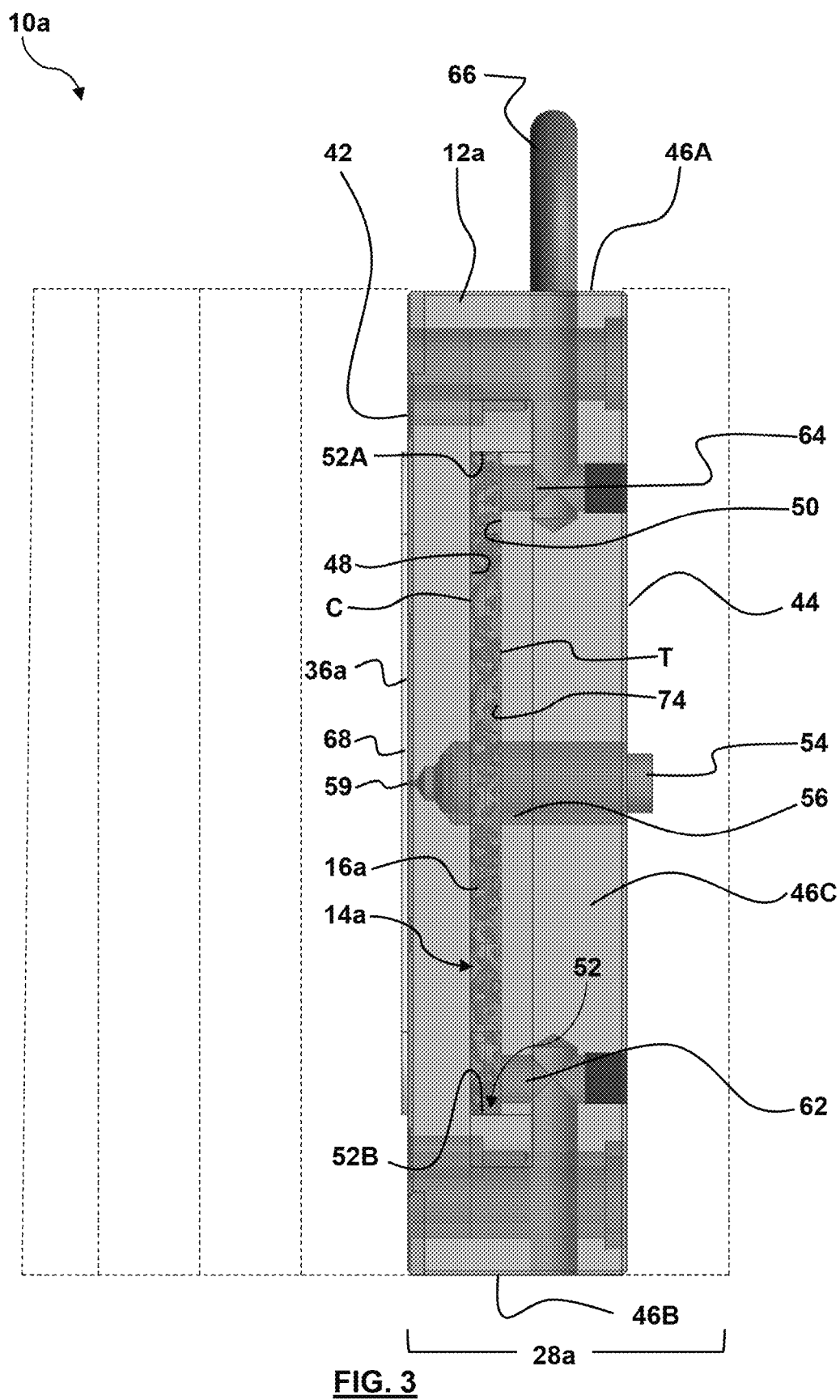
FIG. 3 is a side view of the mold having the stationary side of FIG. 2.
Figure 4:
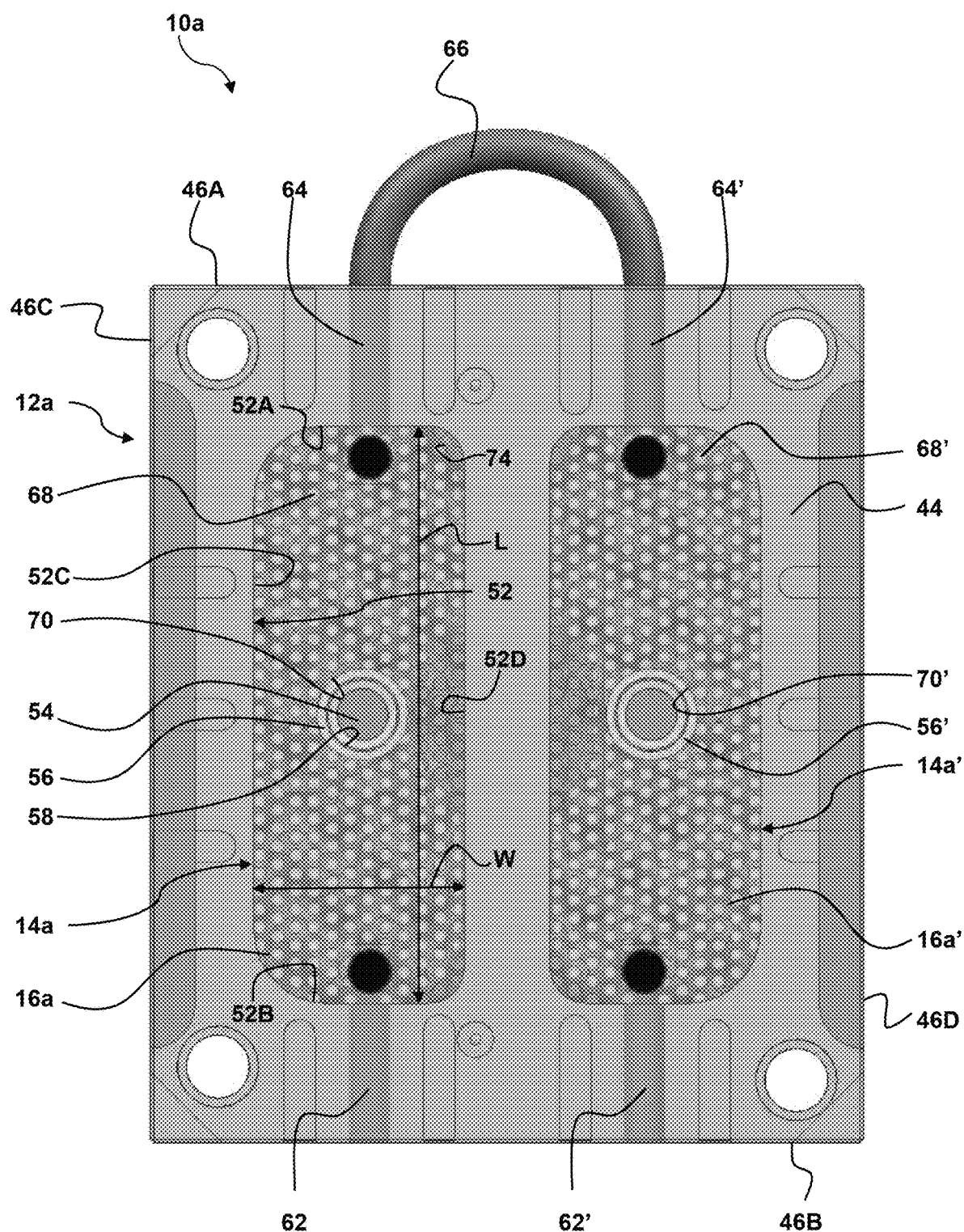
FIG. 4 is a rear view of the dispersion cooling mold plate of FIG. 2.

Referring now to FIG. 2, FIG. 3, and FIG. 4, in which FIG. 2 is a rear perspective view of a stationary side 28a of a mold 10a having a cooling plate 12a in accordance with an embodiment of the present disclosure, FIG. 3 is a side view of mold 10a, and FIG. 4 is a rear view of cooling plate 12a. Features and aspects of the current embodiment can be used accordingly with the other embodiments. Cooling plate 12a includes a front side 42, a rear side 44, and a perimeter that extends between front side 42 and rear side 44. Front side 42 and rear side 44 are planar and are parallel to each other. In the illustrated embodiment of FIGS. 2-4, cooling plate 12a is cuboid shaped and has a perimeter which includes four perimeter sides 46A, 46B, 46C, 46D that are orthogonal to front side 42 and rear side 44. In the illustrated embodiment of FIGS. 2-4, perimeter sides 46A, 46B, 46C, 46D can be referred to as top side 46A, bottom side 46B, front side 46C and rear side 46D of mold 10a.

Referring to FIG. 3, a cooling chamber 14a is formed within cooling plate 12a. Cooling chamber 14a includes a front wall 48 and a rear wall 50. Front wall 48 and rear wall 50 are planar and are parallel to each other and are also parallel to front and rear sides 42, 44 of cooling plate 12a. Referring to FIGS. 2 and 4, cooling chamber 14a includes a perimeter wall 52 that extends between front wall 48 and rear wall 50. In the illustrated embodiment of FIGS. 2-4, perimeter wall 52 includes four perimeter wall portions 52A, 52B, 52C, 52D (see FIG. 4). Perimeter wall portions 52A, 52B can be referred to as ends 52A, 52B of cooling chamber 14a and perimeter wall portions 52C, 52D can be referred to as longitudinal sides 52C, 52D of cooling chamber 14a.

At locations where a mold component crosses cooling chamber 14a, for example, a melt delivery component such as a hot runner nozzle 54 as shown in the illustrated embodiment of FIGS. 2-4, cooling plate 12a includes a pillar 56 (see FIGS. 3 and 4) that extends between front wall 48 and rear wall 50. A passageway 58 (see FIG. 4) extends through pillar 56 to front and rear sides 42, 44 of cooling plate 12a. Passageway 58 is sized to receive hot runner nozzle 54. A distal end of passageway 58 includes a mold gate 59 (see FIG. 3) through which molding material is injected to form a molded article 68. In addition to providing a pathway across cooling chamber 14a, pillar 56 can also be used to support cooling plate 12a against injection pressure.

Cooling plate 12a includes two longitudinally spaced apart fluid ducts 62, 64 that extend to cooling chamber 14a at or near to ends 52A, 52B of cooling chamber 14a (see FIG. 3). In the illustrated embodiment of FIGS. 2-4, fluid ducts 62, 64 extend from perimeter sides 46C, 46A of dispersion cooling plate 12a to rear wall 50 (see FIG. 3) of cooling chamber 14a. Fluid duct 62 is an inlet passageway which supplies cooling fluid to cooling chamber 14a and fluid duct 64 is an outlet passageway which receives cooling fluid from cooling chamber 14a. In the illustrated embodiment of FIGS. 2-4, cooling plate 12a includes a plurality of laterally spaced apart cooling chambers 14a, 14a', each of which provides cooling to a respective newly molded article 68, 68' (see FIGS. 2 and 4). Each cooling chamber 14a, 14a' includes respective ducts 62, 62', 64, 64' (see FIGS. 2 and 4). Cooling chambers 14a, 14a' can be connected in series. For example, as shown in FIGS. 2 and 4 outlet duct 64 from cooling chamber 14a is in fluid communication with inlet duct 64' of second cooling chamber 14a' by a hose 66 or other fluid connector. Alternatively, (not shown) cooling chamber 14a and cooling chamber 14a' are connected in parallel.

Continuing with FIGS. 2 and 4, each cooling chamber 14a, 14a' includes a respective pillar 56, 56' and is occupied by a respective dispersion mesh 16a, 16a'. To accommodate pillars 56, 56', each dispersion mesh 16a, 16a' includes a respective opening 70, 70', through which respective pillars 56, 56' extend. (see FIG. 4). Referring to dispersion mesh 16a, although the following description applies to both dispersion mesh 16a and dispersion mesh 16a', dispersion mesh 16a is configured to create a turbulent flow of cooling fluid within cooling chamber 14a and discourage preferential flow of cooling fluid within cooling chamber 14a, that is, flow of cooling fluid along the shortest pathway between inlet duct 62 and outlet duct 64. Dispersion mesh 16a restricts an incoming flow of cooling fluid to cooling chamber 14a and directs the flow of cooling fluid outward towards longitudinal sides 52C, 52D of perimeter wall 52. The structure of dispersion mesh 16a promotes uniform, turbulent flow of cooling fluid across a width W of cooling chamber 14a and along a length L of cooling chamber 14a (see FIG. 4) which creates a generally constant backpressure gradient within cooling chamber 14a from inlet fluid duct 62 to outlet fluid duct 64.

Referring now to FIG. 5 which is a top view of a sheet 72 of material from which dispersion mesh 16a is formed. Sheet 72 is generally flat and includes a plurality of holes 74 extending therethrough. The plurality of holes 74 are substantially evenly distributed, for example, in an array, or more precisely in a staggered array as shown in the illustrated embodiment of FIG. 5. The size and spacing of the plurality of holes 74 is such that 45%-55% of the spatial area of sheet 72 is occupied by holes 74. In other words, the size and spacing of the plurality of holes 74 is such that half or substantially half of sheet 72 is open area, or half or substantially half of the surface area of sheet 72 is perforated by the plurality of holes 74.

Figure 7:
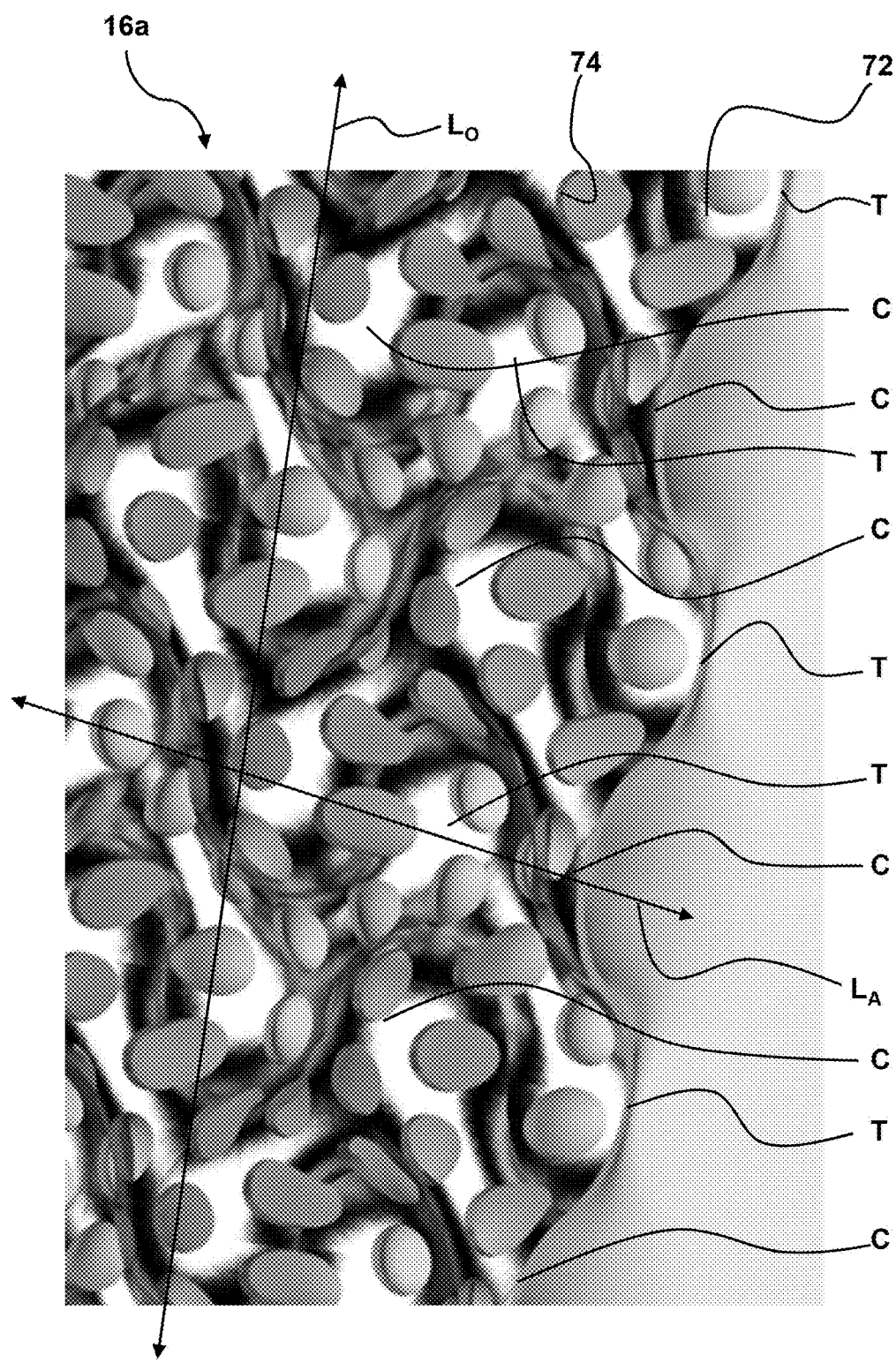
FIG. 7 is a perspective view of a portion of the dispersion mesh of FIG. 2.

Continuing with FIG. 5 and referring to FIG. 6 and FIG. 7, in which FIG. 6 is a side view of dispersion mesh 16a formed from sheet 72, and FIG. 7 is a perspective view of a portion of dispersion mesh 16a. Dispersion mesh 16a is formed by transforming sheet 72 via, for example, a forming die into a three-dimensional structure having a plurality of alternating crests C and troughs T that extend laterally, shown by double ended arrow $L_A$ in FIG. 7, and longitudinally, shown by double ended arrow $L_O$ in FIG. 7, across dispersion mesh 16a. In the resulting structure, through any hole 74, a sightline that is parallel to front and rear walls 48, 50 of cooling chamber 14a is interrupted by an unperforated portion of sheet 72 from which dispersion mesh 16a is formed. In other words, through a sightline that is parallel to front and rear walls 48, 50 of cooling chamber 14a, adjacent holes 72 are laterally offset from each other. The effectiveness of dispersion mesh 16a at distributing a flow of cooling fluid across the width W and along the length L of cooling chamber 14a is not significantly affected by the angular orientation of the pattern of crests C, troughs T, and holes 74 within cooling chamber 14a When dispersion mesh 16a is installed in cooling chamber 14a, crests C and troughs T are seated against front and rear walls 48, 50 of cooling chamber 14a (see FIG. 3) which promotes turbulent flow of cooling fluid by encouraging flow between adjacent crests C and troughs T and through holes 74. To ensure contact between dispersion mesh 16a and front and rear walls 48, 50, dispersion mesh 16a is compressed between front and rear walls 48, 50 of cooling chamber 14a. While dispersion mesh 16a is described above as being formed form a sheet of material, dispersion mesh 16a can also be made using an additive manufacturing process, such as direct metal laser sintering (DMLS).

Dispersion mesh 16a can be made from the same material from which dispersion cooling plate 12a is made, for example, P20 mold steel or H13 tool steel. Dispersion mesh 16a can also be made from a material that is more thermally conductive than the material from which dispersion cooling plate 12a is made. For example, if cooling plate 12a is made from P20 mold steel or H13 tool steel, dispersion mesh 16a can be made from aluminum or an alloy thereof, or copper or an alloy thereof. Dispersion mesh 16a can also be made from a corrosion resistant material, for example, 420 stainless steel or 17-4 stainless steel. Alternatively, a dispersion mesh 16a can be made from one of the previously listed materials and include a suitable corrosion resistant coating. For example, dispersion mesh 16a can be made from H13 tool steel and is nickel plated to resist corrosion.

Figure 8:
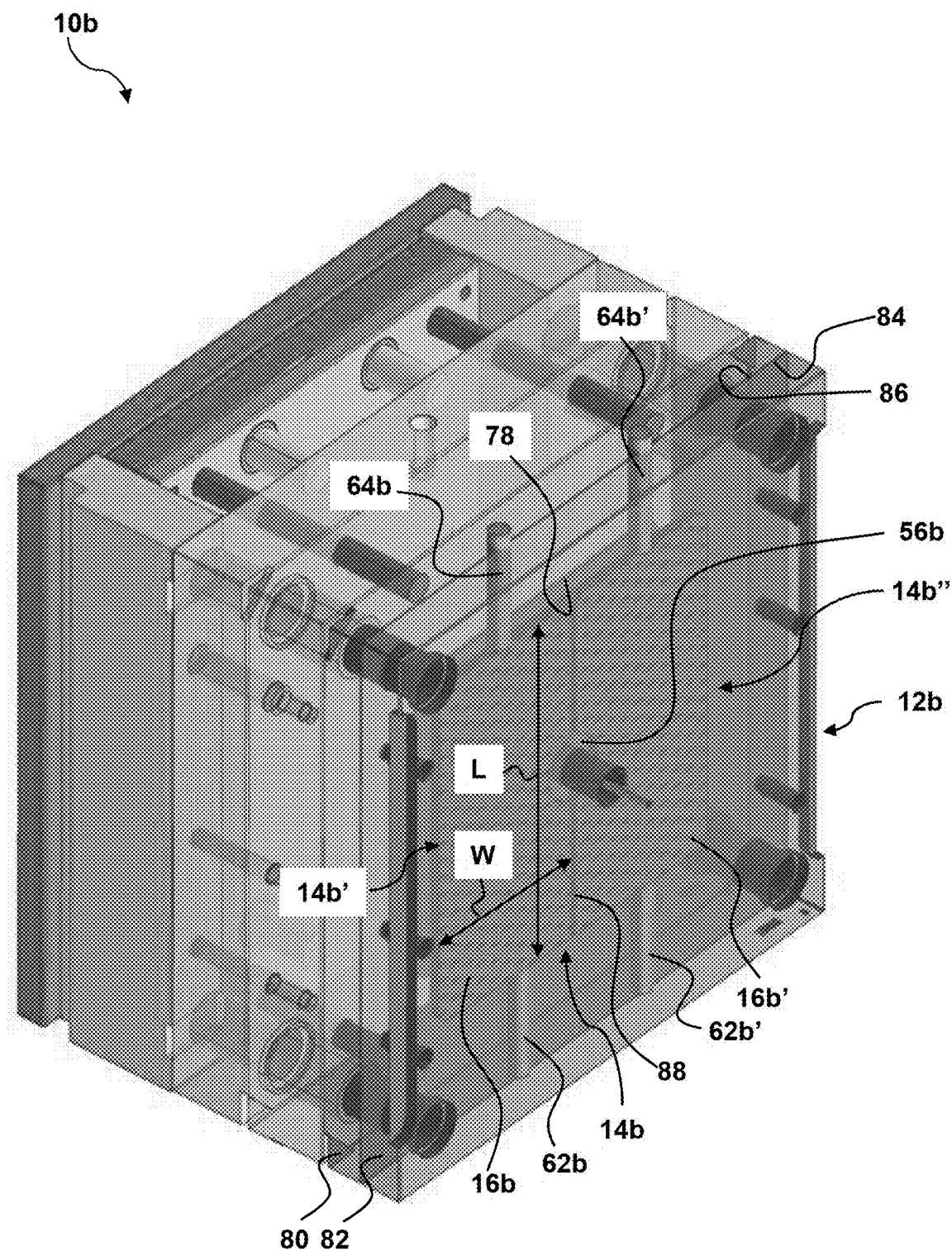
FIG. 8 is a rear perspective transparent view of an injection mold shown without a top-clamp plate for ease of viewing a dispersion cooling mold plate in accordance with another embodiment of the present disclosure.
Figure 9:
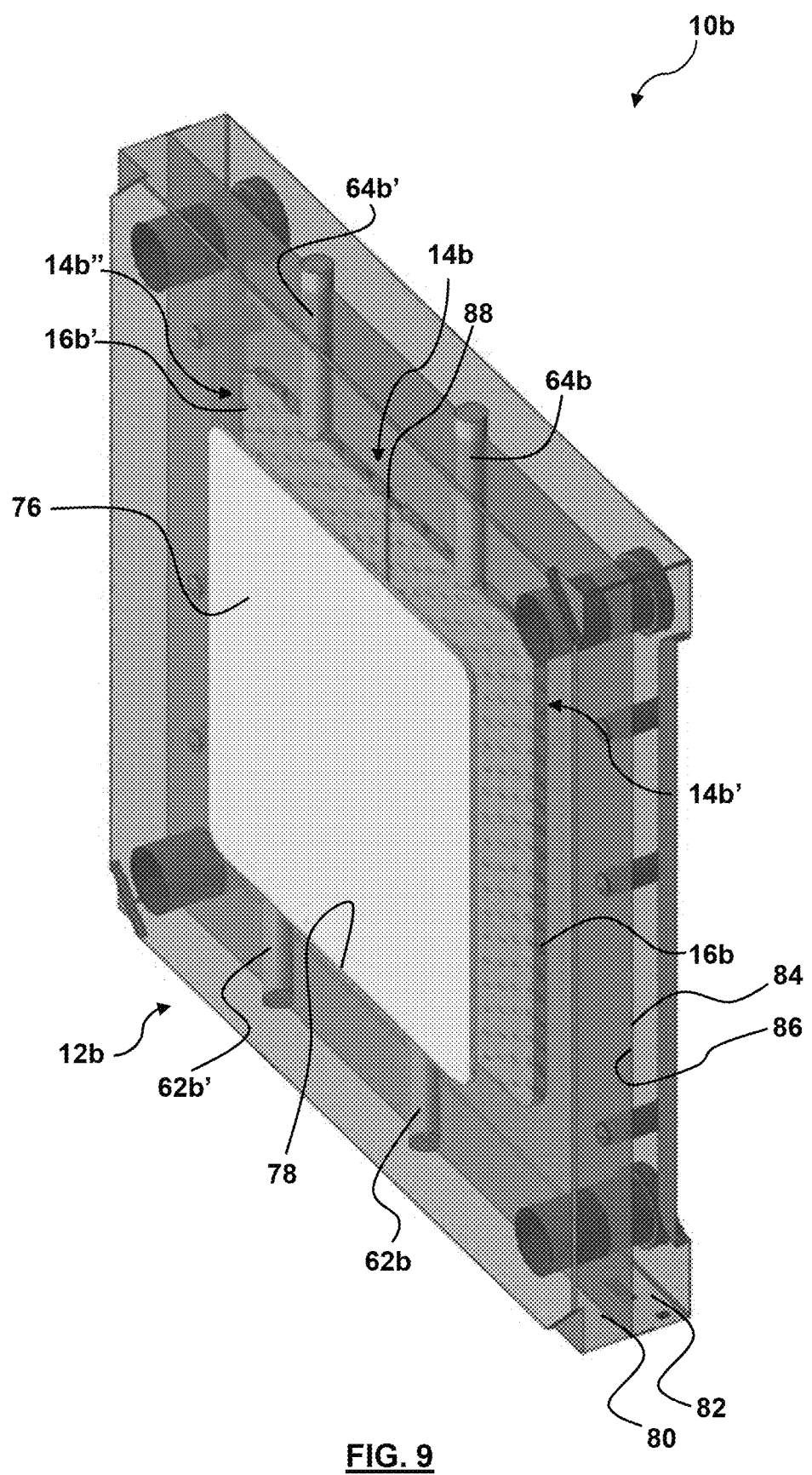
FIG. 9 is a front perspective transparent view of the dispersion cooling plate of FIG. 8 shown with a molded article.

Referring now to FIGS. 8 and 9, in which FIG. 8 is a rear perspective transparent view of a mold 10b shown without a top-clamp plate for ease of viewing, and having a dispersion cooling plate 12b in accordance with another embodiment of the present disclosure, and FIG. 9 is a front perspective transparent view of cooling plate 12b of FIG. 8, shown with a molded article 76 for reference. Features and aspects of the current embodiment can be used accordingly with the other embodiments. In the illustrated embodiment of FIGS. 8 and 9, cooling plate 12b includes a cooling chamber 14b having two cooling sub-chambers 14b', 14b". Cooling chamber 14b is described as cooling sub-chambers 14b', 14b" when two or more cooling chambers provide cooling to one cavity portion of a mold cavity 78. Each cooling sub-chamber 14b', 14b" includes respective fluid ducts 62b', 64b', 62b", 64b" which extend from the perimeter of cooling plate 12b to the end walls of respective cooling sub-chambers 14b', 14b". First and second cooling sub-chambers 14b', 14b" are occupied by a respective dispersion mesh 16b', 16b". In the illustrated embodiment of FIGS. 8 and 9, dispersion meshes 16b', 16b" include a plurality of spaced apart elongate perforated fins that extend heightwise H between the front and rear walls of respective cooling sub chambers 14b', 14b" and lengthwise across the respective widths W of cooling sub chambers 14b', 14b" Examples of suitable materials from which dispersion mesh 16b is made include "Flat Crest Perforated Aluminum Mesh" available from Robinson Fin of Kenton Ohio, U.S.A. and "Standard Expanded Metal Grating" available from Alro Steel of Jackson Michigan, U.S.A. It should be appreciated that when shaping dispersion meshes 16b', 16b" to occupy respective cooling sub-chambers 14b', 14b", fins or contours associated therewith should extend transverse to the direction of water flow from ducts 62b', 62b" to cooling sub-chambers 14b', 14b" such that upon entering cooling sub-chambers 14b', 14b" the flow of cooling fluid is directed across a width W and along a length L of cooling sub-chambers 14b', 14b".

In the illustrated embodiment of FIGS. 8 and 9, cooling plate 12b includes a front plate portion 80 and a rear plate portion 82 which are secured together along respective front and rear plate adjoining surfaces 84, 86 to define cooling chamber 14b therebetween. Also, in the illustrated embodiment of FIGS. 8 and 9, first and second sub-cooling chambers 14b', 14b" are separated by a partition 88 that supports cooling plate 12b against injection pressure. In the illustrated embodiment of FIGS. 8 and 9, partition 88 includes a pillar 56b (see FIG. 8) which is positioned such that a portion of pillar 56b is located within first sub-cooling chamber 14b' and a portion of pillar 56b is located within second sub-cooling chamber 14b".

Figure 12:
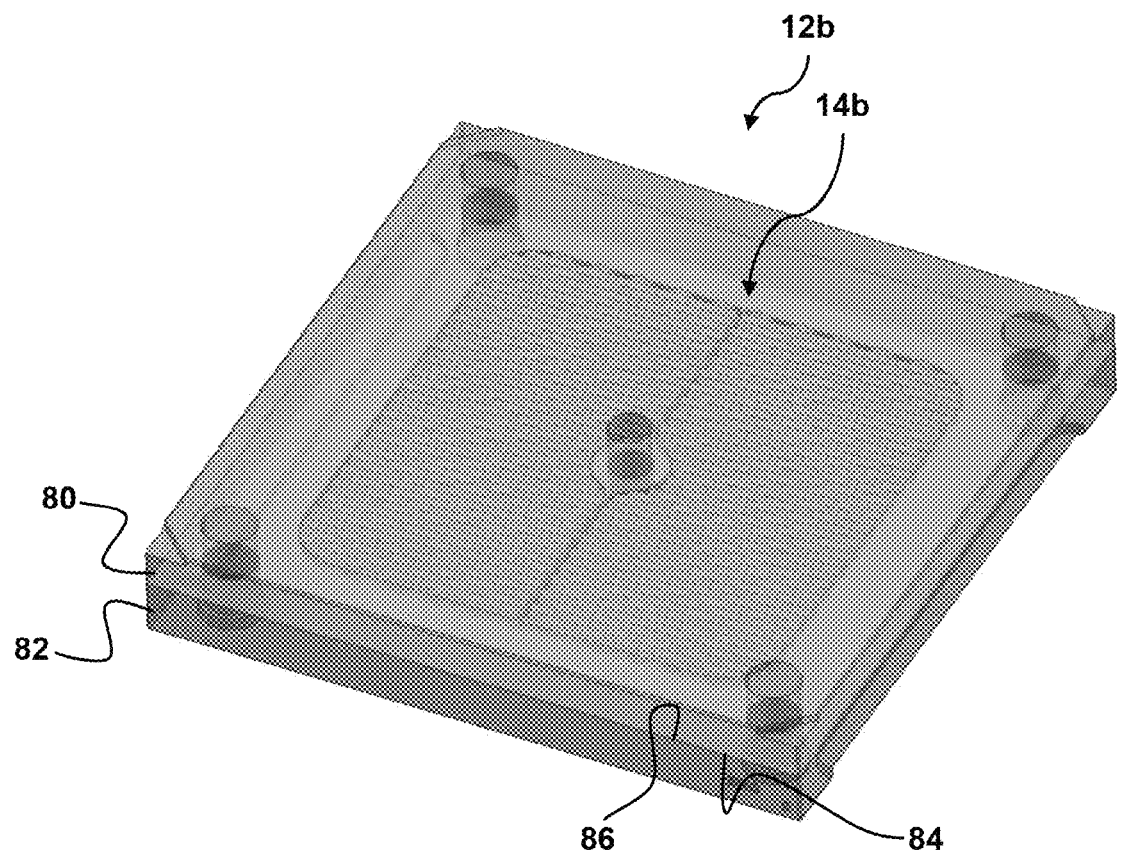

Referring now to FIGS. 10, 11, and 12 which are perspective views of cooling plate 12b of FIGS. 8 and 9 following operations in a manufacturing sequence thereof, in accordance with an embodiment of the present disclosure. FIG. 10 is a perspective view of cooling plate 12b following a first operation in a manufacturing sequence thereof. First and second pockets 90', 90", which define in part first and second sub-cooling chambers 14b', 14b", are formed in adjoining surface 86 of rear plate portion 82. Partition 88, as well as pillar 56b which together separate first and second sub-cooling chambers 14b', 14b" are shown clearly in FIG. 10.

FIG. 11 is a perspective view of cooling plate 12b following a second operation in a manufacturing sequence thereof. Respective dispersion meshes 16b', 16b", which are sized to occupy what will become first and second sub-cooling chambers 14b', 14b", are seated in respective first and second pockets 90', 90".

FIG. 12 is a perspective view of cooling plate 12b following a third operation in a manufacturing sequence thereof. Front plate portion 80 and rear plate portion 82 are secured together along plate adjoining surfaces 84, 86 to form cooling chamber 14b, having first and second sub-cooling chambers 14b', 14b" therebetween. Front plate portion 80 and rear plate portion 82 can be fixedly attached together, by, for example, diffusion bonding or vacuum brazing. Alternatively, front plate portion 80 and rear plate portion 82 can be releasably attached together, by, for example a plurality of fasteners that extend between front and rear plate portions 80, 82 and are distributed around cooling chamber 14b. If front plate portion 80 and rear plate portion 82 are releasably attached together, a gasket or other suitable sealing member (not shown) is provided between front and rear plate portions 80, 82 to reduce the likelihood of cooling fluid leaking from cooling chamber 14b. Releasably attached front and rear plate portions 80, 82 allows access to first and second sub-cooling chambers 14b', 14b" and respective dispersion meshes 16b', 16b" to perform maintenance to dispersion cooling mold plate 12b, such as removing accumulation of scale or sediment, or replacing one or both of dispersion meshes 16b', 16b", which can improve the operational lifespan of cooling plate 12b. In addition, separable front and rear plate portions 80, 82 allows rear plate portion 82 to be used with a different front plate portion 80 (not shown) having a different cavity portion formed therein, which allows cooling plate 12b to be used with a different injection mold and reduces costs to the end user.

As illustrated in the manufacturing sequence shown in FIGS. 10-12, cooling chamber 14b is formed by pockets 90', 90" in rear plate portion 82 which are enclosed by front plate portion 80. In an alternative manufacturing sequence (not shown) a cooling chamber similar to cooling chamber 14b is formed by respective pockets formed in front plate portion 80 which are enclosed by rear plate portion 82. In another alternative manufacturing sequence (not shown) a cooling chamber similar to cooling chamber 14b is formed by front pockets in front plate portion 80 and rear pockets in rear plate portion 82, and together the front and rear pockets form a cooling chamber when front and rear plate portions 80, 82 are secured together. In yet another alternative manufacturing sequence (not shown) a cooling chamber similar to cooling chamber 14b is formed by a frame shaped intermediate plate (not shown) that is sandwiched between front and rear plate portions 80, 82.

Front plate portion 80 and rear plate portion 82 can be made from the same material or can be made from different materials. For example, if front plate portion 80 and rear plate portion 82 are made from different materials, it may be beneficial to make front plate portion 80 from a high-quality material, such as Grade 420 stainless tool steel since front plate portion 80 may define a molding surface, whereas rear plate portion 82 can be made from a material which has good structural characteristics, but is more cost effective than Grade 420 stainless tool steel given the requirements of rear plate portion 82.

In an alternative manufacturing sequence (not shown) cooling plate 12b is made using an additive manufacturing process, such as direct metal laser sintering (DMLS), which allows a cavity portion of a mold cavity to be formed in cooling plate 12b as cooling plate 12b is three dimensionally printed.

Referring now to FIGS. 13 and 14 in which FIG. 13 is a top transparent view of a cooling plate 12c, in accordance with yet another embodiment of the present disclosure and FIG. 14 is a top transparent view of a cooling plate 12d in accordance with yet another embodiment of the present disclosure. Features and aspects of the illustrated embodiments shown in FIGS. 13 and 14 can be used accordingly with the other embodiments. Cooling chambers 14c, 14d of cooling plate 12c, 12d provide cooling to a plurality of mold cavity portions 92, 94. As shown herein, mold cavity portions 92, 94 are formed directly within respective dispersion cooling mold plates 12c, 12d. In an alternative embodiment (not shown) mold cavity portions 92, 94 can be formed in inserts that are seated within their respective cooling plate 12c, 12d.

In the illustrated embodiments of FIGS. 13 and 14 the thicknesses $T_Rc$, $T_Rd$ of rear plate portions 82c, 82d of dispersion cooling mold plates 12c, 12d are the same or is substantially the same; however, the thicknesses $T_Fc$, $T_Fd$ of respective front plate portions 80c, 80d are different. Specifically, the thickness $T_Fc$ of front plate portion 80c is greater than the thickness $T_Fd$ of front plate portion 80d.

If dispersion cooling mold plates 12c, 12d are manufactured by a manufacturer/vendor of mold plates and/or mold bases, rear plate portions 82c, 82d can be manufactured in a plurality of standard thicknesses, each rear plate portion having a pocket or pockets sized to receive a dispersion mesh such as one of the previously described dispersion meshes 16a, 16b. Similarly, front plate portions 80c, 80d can be manufactured in a plurality of standard thicknesses $T_F$, each standardized thickness front plate portion being suitable for a range of cavity portion depths D.

Referring to FIG. 14, the thickness $T_Fd$ of front plate portion 80d depends on a number of factors including a depth D that cavity portion 94 extends into front plate portion 80d and the effective thickness $T_E$ of material between a bottom 96 of cavity portion 94 and front wall 48d cooling chamber 14d that is required to enable sufficient cooling of newly molded articles while limiting or preventing deflection of front plate portion 80d where it overlays cooling chamber 14d. Effective thickness $T_E$ depends on a number of factors including the shape of the part formed in part by cooling plate 12d, the injection pressure needed to fill the part, and the material selected for front plate portion 80d. By way of example, the minimum effective thickness $T_E$ of material between bottom 96 of cavity portion 94 and cooling chamber 14d is between 0.250 inch and 0.500 inch.

Cooling plate 14d can be manufactured by adjoining a rear plate portion 82d having a standardized thickness $T_Rd$ with a front plate portion, 80d also having a standardized thickness $T_Fd$. If the thickness $T_Fd$ of front plate portion 80d is too large to achieve a desired effective thickness $T_E$ once cavity portion 94 is formed therein, front plate portion 80d can be machined to an appropriate thickness $T_Fd$ that will result in achieving the desired effective thickness $T_E$ once cavity portion 94 is formed therein. Reducing the thickness of front plate portion 80d can occur either before or after front plate portion 80d and rear plate portion 82d are adjoined together to form dispersion cooing mold plate 12d.

Figure 15:
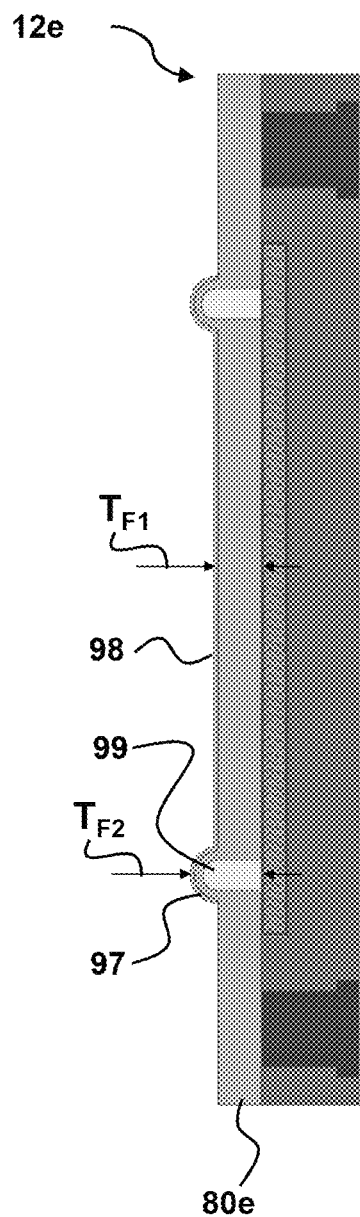
FIG. 15 is a top transparent view of a dispersion cooling plate, in accordance with yet another embodiment of the present disclosure.

Referring now to FIG. 15 which is a top transparent view of a cooling plate 12e, in accordance with yet another embodiment of the present disclosure. Features and aspects of the illustrated embodiment shown in FIG. 15 can be used accordingly with the other embodiments. Cooling plate 12e includes a front plate portion 80e having a first thickness portion $T_{F1}$ and a second thickness portion $T_{F2}$ which is greater than first thickness portion $T_{F1}$. A contoured molding surface 97 extends between first and second thickness portions $T_{F1}$, $T_{F2}$. A portion of a molded article 98 which is defined in part by contoured molding surface 97 is spaced apart from cooling chamber 14e, having a dispersion mesh disposed therein such as one of the previously described dispersion meshes 16a, 16b, by a distance that correspond to $T_{F1}$. Another portion of molded article 98 is spaced apart from cooling chamber 14e by a distances that correspond to $T_{F2}$. To improve cooling to the portion of molded article 98 that is further away from cooling chamber 14e, front plate portion 80e includes a conductive insert 99 that extends into front plate portion 80e, from cooling chamber 14e, towards contoured molding surface 97. Conductive insert 99 is made from a material that is more thermally conductive than the material from which front plate portion 80e is made, which helps to draw heat away from molded article 98 at locations where front plate portion 80e may be too thick to effectively cool molded article 98. By way of example and not limitation conductive insert is made from copper or a copper alloy.

While various embodiments have been described above, they have been presented only as illustrations and examples of the present invention, and not by way of limitation. It will be apparent to persons skilled in the relevant art that various changes in form and detail can be made therein without departing from the scope of the invention. Thus, the scope of the present invention should not be limited by any of the above-described exemplary embodiments but should be defined only in accordance with the appended claims and their equivalents.

What is claimed is:
1. A fluid cooled mold plate comprising:
    a front side, a rear side, and a perimeter extending between the front side and the rear side;

a cooling chamber formed within the mold plate, the cooling chamber having a front wall, a rear wall, and a perimeter wall extending between the front wall and the rear wall;

an inlet fluid duct extending from a first side of the perimeter of the mold plate to a first end of the cooling chamber;

an outlet fluid duct extending from a second side of the perimeter of the mold plate to a second end of the cooling chamber that is opposite to the first end of the cooling chamber;

the cooling chamber being occupied by a dispersion mesh secured between the front wall and the rear wall of the cooling chamber; and a front plate portion partially defining the cooling chamber, the front plate portion including a conductive insert extending into the front plate portion from the cooling chamber.

2. The mold plate of claim 1, wherein the dispersion mesh is formed from a sheet of material having a plurality of holes extending therethrough, the dispersion mesh having a plurality of alternating crests and troughs, wherein the plurality of alternating crests and troughs extending laterally and longitudinally across the sheet of material.

3. The mold plate of claim 2, wherein the size and spacing of the plurality of holes is such that 45% to 55% of the sheet is open area.

4. The mold plate of claim 2, wherein the size and spacing of the plurality of holes is such that substantially half of the sheet is open area.

5. The mold plate of claim 1, wherein the dispersion mesh includes a plurality of spaced apart elongate perforated fins extending heightwise between the front wall of the cooling chamber and the rear wall of the cooling chamber, and the plurality of elongate fins extending lengthwise across the width of the cooling chamber.

6. The mold plate of claim 1, wherein the dispersion mesh is made from the same material from which the mold plate is made.

7. The mold plate of claim 1, wherein the dispersion mesh is made from a material that is more thermally conductive than the material from which the mold plate is made.

8. The mold plate of claim 1, wherein the dispersion mesh includes a corrosion resistant coating.

9. The mold plate of claim 1, wherein the mold plate includes a rear plate portion, the front plate portion and the rear plate portion being secured together to define the cooling chamber therebetween.

10. The mold plate of claim 9, wherein the chamber is formed by a pocket in the rear plate portion that is enclosed by the front plate portion when the front plate portion and the rear plate portion are secured together.

11. The mold plate of claim 9, wherein the front plate portion and the rear plate portion are made from different materials.

12. The mold plate of claim 9, wherein the front plate portion and the rear plate portion are integrally attached together.

13. The mold plate of claim 12, wherein integrally attached together includes vacuum brazing or diffusion bonding.

14. The mold plate of claim 9, wherein the front plate portion and the rear plate portion are releasably attached together.

15. The mold plate of claim 9, wherein the front plate portion includes a first thickness portion and a second thickness portion thicker than the first thickness portion, the conductive insert extending into the second thickness portion from the cooling chamber.

16. The mold plate of claim 1, further comprising:
a pillar extending between the front wall of the cooling chamber and the rear wall of the cooling chamber and the dispersion mesh includes an opening through which the pillar extends.

17. The mold plate of claim 16, wherein the pillar includes a passageway extending through the pillar and the mold plate.

18. The mold plate of claim 17, wherein the passageway is sized to receive a hot runner nozzle, and a distal end of the passageway includes a mold gate.

19. The mold plate of claim 1, further comprising:
a second cooling chamber formed within the mold plate, the second cooling chamber laterally spaced apart from the cooling chamber, the second cooling chamber having a front wall, a rear wall, and a perimeter wall extending between the front wall of the second cooling chamber and the rear wall of the second cooling chamber;

a second inlet fluid duct extending from the second side of the perimeter of the mold plate to a second end of the second cooling chamber;

a second outlet fluid duct extending from the first side of the perimeter of the mold plate to a first end of the second cooling chamber that is opposite to the second end of the second cooling chamber; and the second cooling chamber occupied by a second dispersion mesh that is compressed between the front wall and the rear wall of the second cooling chamber.

20. The mold plate of claim 1, wherein the cooling chamber includes a first cooling sub-chamber and a second cooling sub-chamber that are separated by a partition.

* * * * *